United States Patent
Zhang et al.

(10) Patent No.: US 7,225,085 B2
(45) Date of Patent: May 29, 2007

(54) PRECISION GAS FLOW METER

(75) Inventors: Ruihong Zhang, Davis, CA (US); Zhongli Pan, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/361,317

(22) Filed: Feb. 23, 2006

(65) Prior Publication Data

US 2006/0224334 A1    Oct. 5, 2006

Related U.S. Application Data

(60) Provisional application No. 60/656,655, filed on Feb. 25, 2005.

(51) Int. Cl.
*G06F 19/00* (2006.01)

(52) U.S. Cl. ............... 702/45; 702/47; 702/50; 702/100; 73/1.16; 73/23.2; 73/23.36; 73/23.24; 73/23.25; 73/23.26; 73/23.27; 137/486; 137/487.5

(58) Field of Classification Search ............ 702/45, 702/50, 100, 47; 73/861.02, 861.03, 215, 73/200, 199, 21, 23.2, 23.24–23.27, 1.16, 73/23.36, 861.05; 137/486, 487.5
See application file for complete search history.

(56) References Cited

U.S. PATENT DOCUMENTS

| | | | |
|---|---|---|---|
| 3,363,461 A | 1/1968 | Minkoff | |
| 3,701,280 A | 10/1972 | Stroman | |
| 3,866,028 A | 2/1975 | Schontzler et al. | |
| 4,064,750 A | 12/1977 | Speece | |
| 4,127,030 A | 11/1978 | Martig, Jr. | |
| 4,285,245 A | 8/1981 | Kennedy | |
| 4,377,948 A | 3/1983 | Tenney, Jr. | |
| 4,918,995 A | 4/1990 | Pearman et al. | |
| 4,953,386 A | 9/1990 | Pearman et al. | |
| 5,062,446 A * | 11/1991 | Anderson | 137/468 |
| 5,656,784 A | 8/1997 | Butch | |
| 5,865,205 A * | 2/1999 | Wilmer | 137/2 |
| 6,216,726 B1 | 4/2001 | Brown et al. | |
| 6,535,830 B2 | 3/2003 | Ruesch et al. | |

FOREIGN PATENT DOCUMENTS

GB    08038286    6/1982

OTHER PUBLICATIONS

S/5 ADU, An integrated solution for quality care, Datex-Ohmeda, brochure, copyright 2000, 8 pages, www.datex-ohmeda.com.

(Continued)

*Primary Examiner*—John Barlow
*Assistant Examiner*—Hien Vo
(74) *Attorney, Agent, or Firm*—John P. O'Banion

(57) ABSTRACT

A precision gas flow meter that is capable of measuring small flow rates of gasses precisely in the range of 0.01 to 10 L per minute. The meter is designed to measure the gas flow in small volume increments of predetermined value, and therefore can be used to measure a gas flow that is continuous or discontinuous. The flow meter can be used to measure the gas production rates from many processes, including biological reactors, chemical reactors, and thermal-chemical reactors. The device can also be used to meter the gases that are required in small or minute volumes.

13 Claims, 3 Drawing Sheets

OTHER PUBLICATIONS

S/5 ADU Carestation, An integrated solution for quality care, Datex-Ohmeda, brochure, copyright 2000, 6 pages, www.datex-ohmeda.com.

Roberts, Fred, Measurement of Volume and Flow in Gases, Anaesthesia and Intensive Care Medicine, 2003, pp. 32-35.

Dosch, Michael P., The Anesthesia Gas Machine, Univ. of Detroit Mercy Graduate Program in Nurse Anesthesiology, date unknown, 6 pages, www.udmercy.edu/crna/agm.

* cited by examiner

PRECISION GAS FLOW METER

CROSS-REFERENCE TO RELATED APPLICATIONS

This application claims priority from U.S. provisional application Ser. No. 60/656,655 filed on Feb. 25, 2005 incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention pertains to a precision gas flow meter, and more particularly to a gas flow meter that measures volume incrementally.

2. Description of Related Art

There are several methods for measuring the volumetric flow rate of a gas. Indirect measurement methods include pressure drop across an orifice, (bobbin rotameter) mechanical movement (rotating a blade or moving a sail switch), heat transfer, (hot wire anemometer) or ultrasound interference. Each of these methods require measurement or knowledge of the gas composition and work best with a steady state gas flow. These methods are not precise for intermittent flow or low flow rates below a predetermined range. Positive displacement methods include liquid displacement spirometers, diaphragm activated devices and rotary vanes. These mechanical systems also perform best at a fairly constant flow rate and require a predetermined pressure difference to function.

These aforementioned devices do not lend themselves to precision measurements of very small volumes of gas flow (less than 0.1 liters per minute) due to seal leakage, required operational pressure drop and difficulty in precise calibration of these mechanical devices Some of these methods such as the spirometer or bobbin rotameter cannot be used to measure reversible gas flow.

Precision measurement of gas flow in small volume increments is required in many processes including biological reactors, chemical reactors and thermal-chemical reactors. Measurement of intermittent or reversible flows is also required.

What is needed is a method and apparatus to conduct precision measurement of small quantities of gas flow. The ability to measure intermittent and reversible gas flow is also needed.

BRIEF SUMMARY OF THE INVENTION

The present invention pertains to a precision gas flow meter. Notably, the gas flow is metered incrementally. An electronic controller opens an inlet valve to allow gas to enter a chamber and closes the inlet valve when the pressure sensor in the chamber detects a pressure that corresponds to a predetermined incremental gas volume. The controller then opens an outlet valve to allow the gas to flow. When the pressure in the chamber is equalized with the outlet condition, the outlet valve is closed. The process then repeats. As the incremental volumes of gas are allowed to flow, the controller keeps track of the number of increments which is indicative of total volume flow. A temperature sensor is also provided in the chamber to allow for computation of gas flow at selected temperatures in addition to pressure.

In one embodiment, a precision gas flow meter comprises a gas holding/measurement chamber; a gas inlet valve coupled to said chamber; a gas outlet valve coupled to said chamber; a pressure sensor positioned in said chamber; a temperature sensor positioned in said chamber; an electronic controller; and programming executable by said electronic controller for carrying out the operations of opening said gas inlet valve wherein gas flows into said chamber, measuring pressure and temperature gas collected in said chamber, closing said gas inlet valve when the pressure of the gas in said chamber reaches a predetermined value which corresponds to a predetermined increment gas volume, opening said gas outlet valve to allow gas to flow out of said chamber, closing said gas outlet valve, recording an increment volume of gas, and calculating the total volume of gas since zero time and the volume of gas measured during a specified period of time.

In another embodiment, a method for precise measurement of gas flow comprises providing a gas holding/measurement chamber; said chamber having a gas inlet valve; said chamber having a gas outlet valve; said chamber having a pressure sensor positioned in said chamber; said chamber having a temperature sensor positioned in said chamber; opening said gas inlet valve wherein gas flows into said chamber; measuring pressure and temperature gas collected in said chamber, closing said gas inlet valve when the pressure of the gas in said chamber reaches a predetermined value which corresponds to a predetermined increment gas volume; opening said gas outlet valve to allow gas to flow out of said chamber; closing said gas outlet valve; recording an increment volume of gas; and calculating the total volume of gas since zero time and the volume of gas measured during a specified period of time.

In a further embodiment, the chamber is configured for operation at a controlled, constant temperature or at an ambient temperature.

In one mode, the volume of gas in said chamber is determined by the pressure and temperature in the chamber. In another mode, the volume of the gas as determined by the pressure and temperature in said chamber is maintained at a positive, predetermined level prior to opening the gas outlet valve. In still another mode, the user is provided with information selected from the group consisting essentially of total volume of gas since zero time, volume of gas for a specified time period, and history of gas volume measurement over time. In a further mode, the gas volume is output at selected temperatures and pressure.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
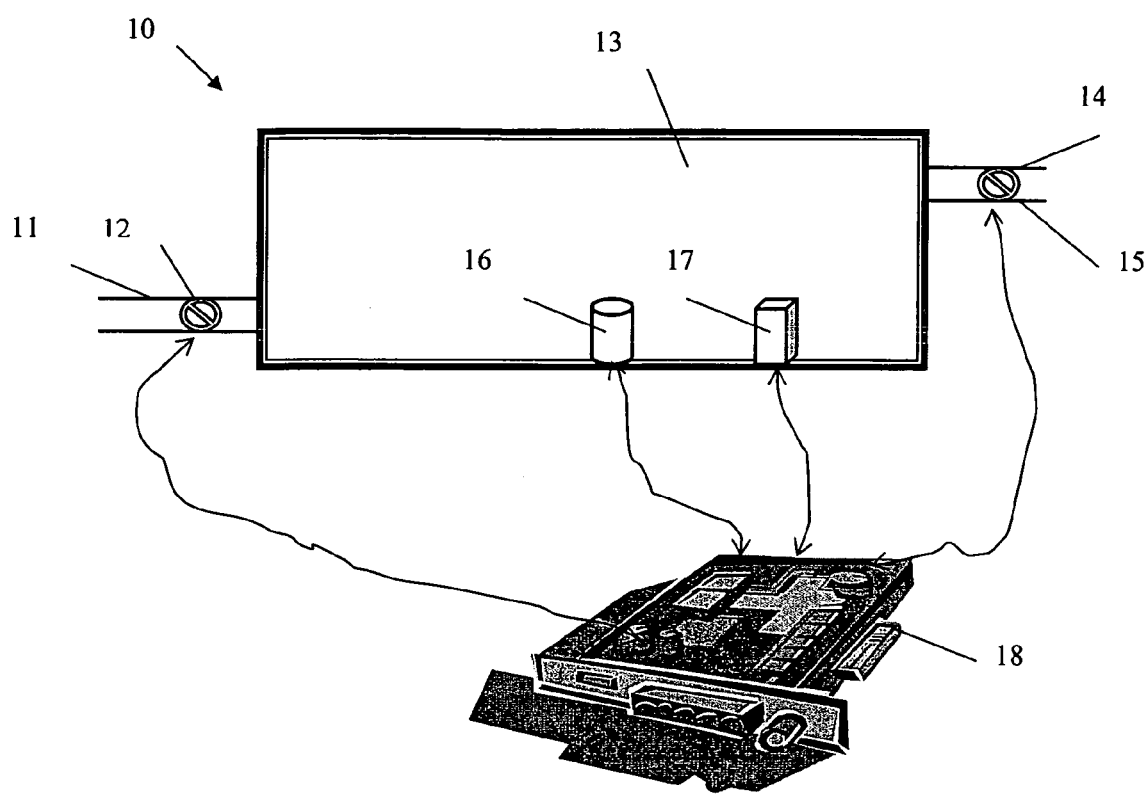
FIG. 1 is a schematic view of a gas flow meter system according to an embodiment of the invention.
Figure 2:
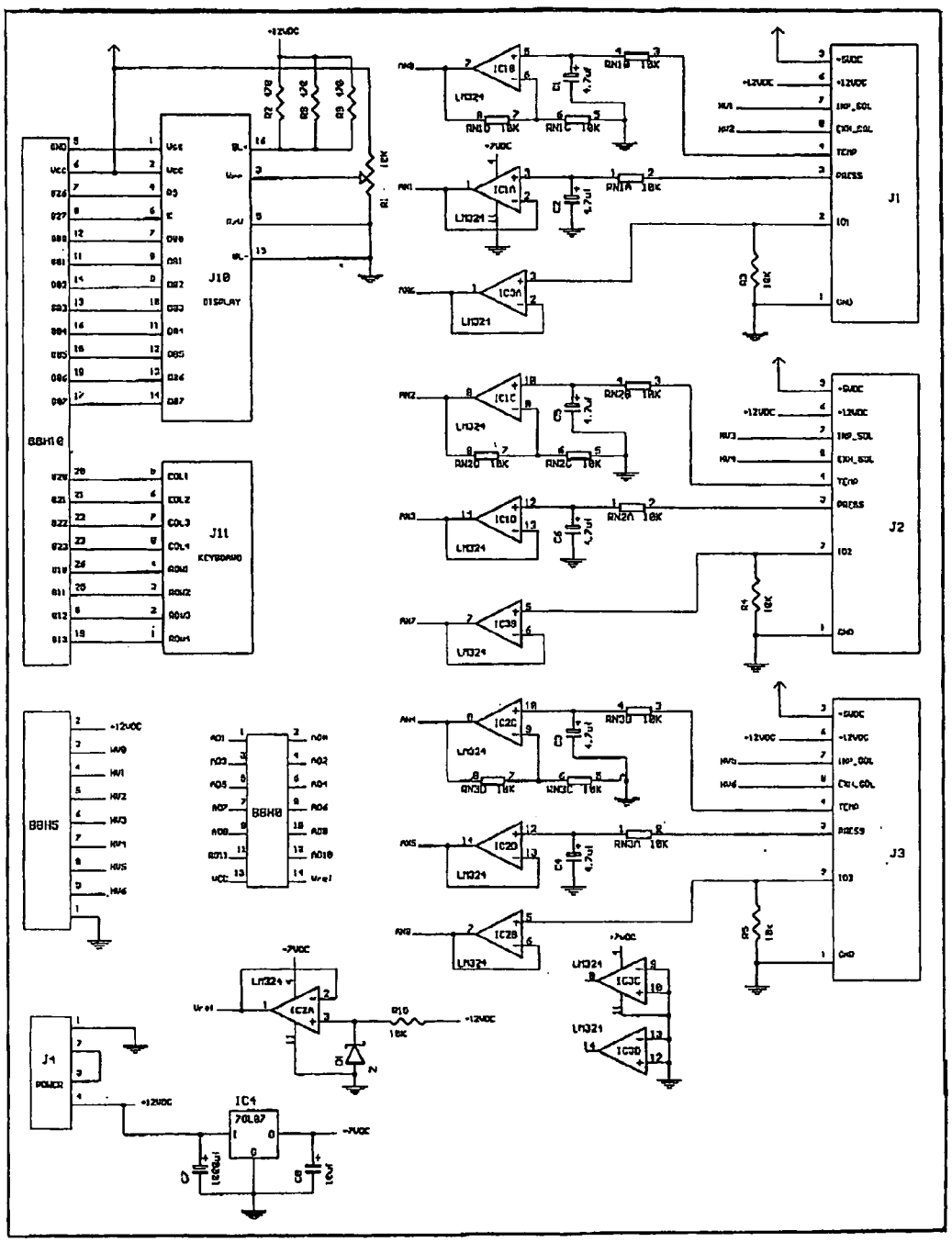
FIG. 2 is a schematic diagram of an electronic controller according to an embodiment of the invention.
Figure 3:
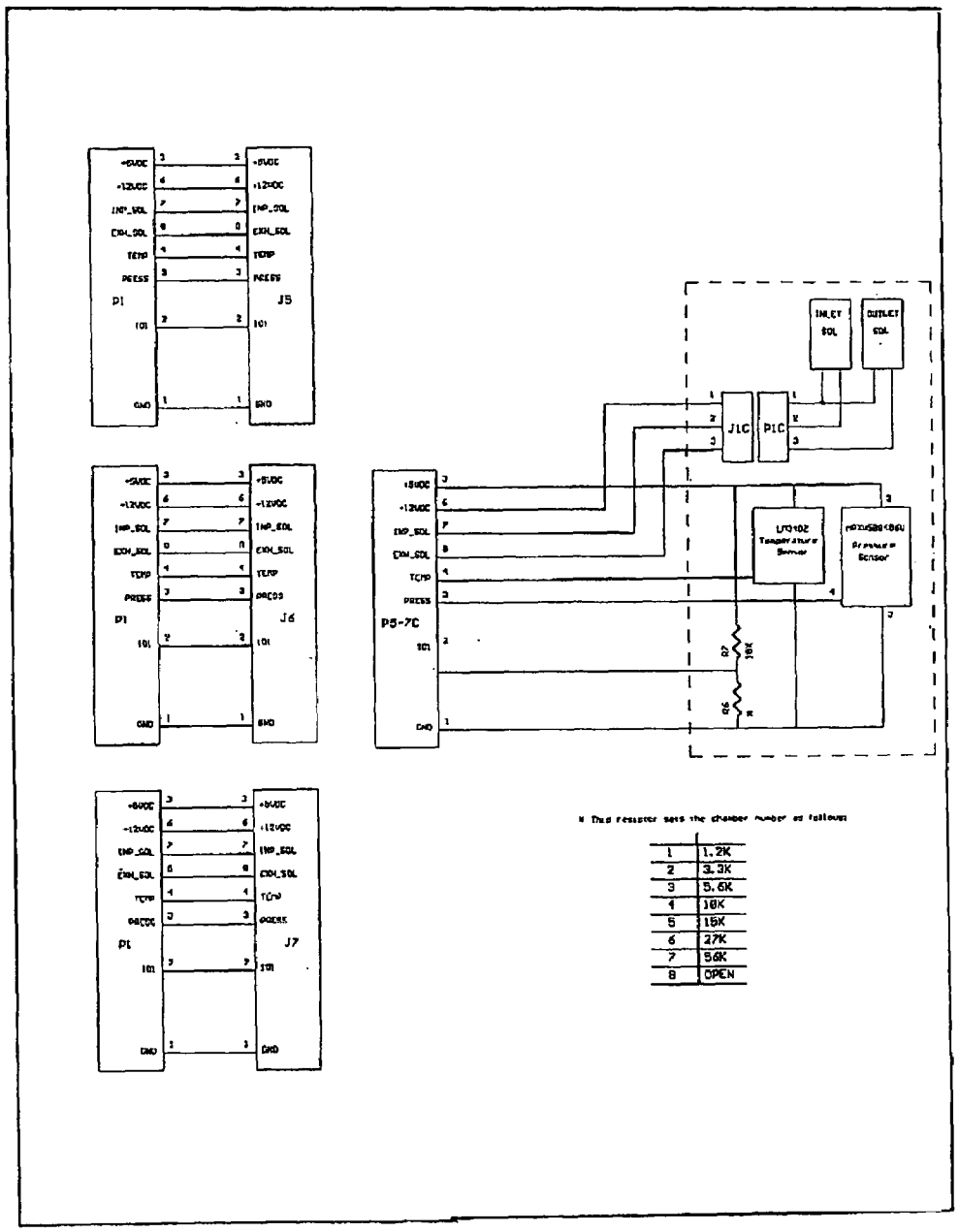
FIG. 3 is a schematic diagram of circuitry for a gas flow meter system according to an embodiment of the invention.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

The present invention is a precision gas flow meter system that performs the following three tasks: (a) gas collecting and venting; (b) gas holding and measurement; and (c) electronic controlling and recording. An exemplary embodiment of the system is shown schematically in FIG. 1.

As can be seen in FIG. 1, an embodiment of the gas flow meter system 10 comprises a gas inlet 11, a gas inlet valve 12, a gas holding/measurement chamber 13, a gas outlet valve 14, a gas outlet 15, a pressure sensor 16, a temperature sensor 17, and an electronic controller 18 with optional recording capability, (e.g., memory) and display driver/output capabilities.

In one embodiment, where the pressure of gas inlet 11 is higher than the pressure of gas in outlet 15, the gas flow meter system 10 shown in FIG. 1 operates in the following manner: First, gas inlet valve 12 opens, and gas flows from the gas inlet 11, through the gas inlet valve 12 and into the gas holding/measurement chamber 13. Next, pressure sensor 16 and the temperature sensor 17 measure the pressure and temperature, respectively, of the gas collected in the holding/measurement chamber 13. Gas inlet valve 12 closes when the pressure of the gas in the gas holding/measurement chamber 13 reaches a predetermined value, which corresponds to a predetermined increment gas volume. Next, gas outlet valve 14 opens to allow gas to flow out of gas holding/measurement chamber 13 through gas outlet 15. Gas outlet valve 14 then closes; and the electronic controller 18 records one increment volume of gas and performs an arithmetic calculation to calculate the total volume of gas since zero time and the volume of gas measured during a specified period of time.

If the pressure of gas varies in outlet 15, then a second reading of pressure and temperature is taken when gas outlet valve is open and the gas pressure has had time to equalize.

The closing and opening actions of the inlet 12 and outlet 14 gas valves are controlled by the electronic controller 18 which is programmed based on the measurement of the pressure sensor. The volume of the gas as determined by the pressure and temperature in the gas holding/measurement chamber 3 is maintained at a positive, predetermined level. Based on the temperature and pressure of the gas in the chamber prior to the opening of the outlet gas valve, the electronic controller calculates the actual volume of the gas increment and records the gas increment volume. The controller 18 is configured such that it provides the user with the following output: (a) total volume of gas since zero time; (b) volume of gas for a specified time period, such as minute, hour or day, and (c) history of gas volume measurement over time. The gas holding/measurement chamber can be operated at a controlled, constant temperature or at an ambient temperature. The controller can be programmed to output gas volume at selected temperatures and pressure.

Note that if the pressure in gas inlet 11 is less than the pressure in gas outlet 15, the gas will flow from gas outlet 15 to gas inlet 11. The procedure for measuring this reverse flow rate is similar as described above and can be accomplished without changing configuration of gas measurement device: First outlet valve 14 is open and gas flows from gas outlet 15 into gas chamber 13. Next, pressure sensor 6 and the temperature sensor 17 measure the pressure and temperature, respectively, of the gas collected in the holding/measurement chamber 13. Gas outlet valve 14 closes when the pressure of the gas in the gas holding/measurement chamber 13 reaches a predetermined value, which corresponds to a predetermined increment gas volume. Next, gas inlet valve 12 opens to allow gas to flow out of gas holding/measurement chamber 13 through gas inlet 11. Gas inlet valve 12 then closes; and the electronic controller 8 records one increment volume of gas and performs an arithmetic calculation to calculate the total volume of gas since zero time and the volume of gas measured during a specified period of time.

Another mode of operation is to operate gas inlet valve 12 and gas outlet valve 14 at predetermined time intervals and measure the pressure and temperature of the gas in gas measurement chamber 13 each time a valve is opened or closed.

The gas chamber is mounted on a base that holds the valves and other accessories. Each gas chamber is installed with two valves; an inlet valve and an outlet valve. Each gas chamber also has one temperature resistor and pressure transducer. Both inlet and outlet valves stay open when the power (provided by the control and display unit) is off. They will be closed when the power is turned on. The inlet valve will be opened after the chamber is reset by the control and display unit via the "reset" key for ready to conduct the gas volume measurement.

For measurement of gas flow on the order of 0.01 to 10 liters per minute the volume of the gas chamber in one embodiment is about 3850 ml.

The electronic controller 18 is a component of a control and display (C/D) unit that controls the opening and closing of the inlet valve 12 and outlet valve 14 and acquires and store measurement data from the temperature sensor and the pressure transducer as described above. The front of the unit preferably has a liquid crystal display (LCD) and a keypad used to operate and read out the gas meter. In a preferred embodiment, each electronic controller 18 can work with up to three gas flow meter systems 10. For example, the display can show the gas chamber number, pressure in the gas chamber in inches of $H_2O$, gas volume (ml) being measured in the gas chamber, and total cumulative gas volume (ml). The keypad has several keys with useful functions. A "reset" key allows the emptying of the gas chamber selected. A "send" key is used to transfer measurement data from the unit to an external computer via a data transmission cable. The numerical keys are used to select the gas chamber number and also making selections when the changes are made to the parameter settings of the selected gas chamber. Three connectors in the back of the unit are provided for connection to the gas chambers. A power cable and switch are also in the back of the unit.

FIG. 2 is a schematic diagram of an embodiment of an electronic control unit 18 according to the present invention. Block J1 is exemplary of a terminal block with inputs for power, control signals to inlet valve 2, outlet valve 4, and sensor signals for temperature and pressure. Block J2 and J3 are similarly configured.

Block J10 is exemplary of display circuitry and Block J11 is exemplary of keyboard wiring.

An example of typical operation of the control and display unit 18 is as follows: First, turn on the power switch until the LCD shows "Initializing." The LCD also shows the number of gas chambers connected and the pressure and gas volumes (the volume being measured in each chamber and cumulative volume);

Next, check all the gas chambers to make sure that they all operate correctly by pressing their respective number (1, 2, or 3) and look at the readings on the display.

Reset the gas volume reading in all gas chambers to zero by pressing "reset", choosing the chamber number (1, 2, or 3) and then pressing 4 (reset total chamber volume).

Check the settings of each chamber to make sure that the values are correct for chamber volume, dump gas volume, total gas volume measured, temperature, pressure, and gas volume being measured in the chamber.

If changes are to be made for the settings of a chamber, select the gas chamber by pressing 1, 2 or 3 key, then press the "reset" key, choose 4 (reset total volume), 5 (reset data memory) or 6 (set chamber parameters). Pressing 4 will empty the chamber, 5 will ask you to empty the data memory, and 6 will take you to three more choices, 7 (gas chamber volume), 8 (gas dump volume) and 9 (set equation coefficients for temperature, and pressure and see A/D data). The temperature and pressure coefficients can be adjusted if necessary.

Under the mode of seeing A/D data, the inlet and outlet valves of the Gas Chamber can be manually opened (O) and closed (X). After manual operation, Reset key should be pressed to allow the C/D Unit to go back into the measurement mode.

It will also be appreciated that the electronic control unit 18 can be formed from a conventional programmable control unit and associated electronics and that one skilled in the art could readily program the controller based on the description of the operation of the invention set forth above.

FIG. 3 is a schematic diagram of circuitry for a gas flow meter system 10 with a connection to an inlet solenoid controlling inlet valve 12, an outlet solenoid controlling outlet valve 14, a temperature sensor and a pressure sensor. It will also be appreciated that other circuitry can be used to connect the components of gas measuring device to a programmable controller.

From the foregoing, it will be appreciated that the gas holding/measurement chamber, valves and sensors form an aspect of the invention. The electronic control unit forms another aspect of the invention. A still further aspect of the invention is the combination of the foregoing elements. And, another aspect of the invention is the method of measurement of gas flow described above.

One exemplary embodiment of the invention uses a gas chamber of 3850 ml. The valves are stainless steel and the thermal sensor can be a thermister, thermocouple or other analog or digital temperature sensor.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A precision gas flow meter, comprising:
   a gas holding/measurement chamber;
   a gas inlet valve coupled to said chamber;
   a gas outlet valve coupled to said chamber;
   a pressure sensor positioned in said chamber;
   a temperature sensor positioned in said chamber;
   an electronic controller; and
   programming executable by said electronic controller for carrying out the operations of
      opening said gas inlet valve wherein gas flows into said chamber,
      measuring pressure and temperature gas collected in said chamber,
      closing said gas inlet valve when the pressure of the gas in said chamber reaches a predetermined value which corresponds to a predetermined increment gas volume;
      opening said gas outlet valve to allow gas to flow out of said chamber;
      closing said gas outlet valve;
      recording an increment volume of gas;
      calculating the total volume of gas since zero time and the volume of gas measured during a specified period of time; and
      outputting the total volume of gas since zero time and the volume of gas measured during a specified period of time to a display or recorder;
   wherein said gas flow is reversible.

2. A precision gas flow meter as recited in claim 1, wherein the volume of gas in said chamber is determined by the pressure and temperature in said chamber.

3. A precision gas flow meter as recited in claim 2, wherein the volume of the gas as determined by the pressure and temperature in said chamber is maintained at a positive, predetermined level prior to opening the gas outlet valve.

4. A precision gas flow meter as recited in claim 1, wherein said programming executable on said controller carries out the operations of providing a user with information selected from the group consisting essentially of total volume of gas since zero time, volume of gas for a specified time period, and history of gas volume measurement over time.

5. A precision gas flow meter as recited in claim 1, wherein said chamber is configured for operation at a controlled, constant temperature or at an ambient temperature.

6. A precision gas flow meter as recited in claim 1, wherein said programming executable on said computer carries out the operations of outputting gas volume at selected temperatures and pressure.

7. A precision gas flow meter as recited in claim 1, further comprising:
   programming executable by said electronic controller for carrying out the operations of
      opening and closing said gas inlet valve and said gas outlet valve at predetermined time intervals, and
      measuring the pressure and temperature in said chamber each time the gas inlet valve or gas outlet valve is opened or closed.

8. A method for precise measurement of gas flow, comprising:
   providing a gas holding/measurement chamber;
   said chamber having a gas inlet valve;
   said chamber having a gas outlet valve;
   said chamber having a pressure sensor positioned in said chamber;
   said chamber having a temperature sensor positioned in said chamber;
   opening said gas inlet valve wherein gas flows into said chamber;
   measuring pressure and temperature gas collected in said chamber,
   closing said gas inlet valve when the pressure of the gas in said chamber reaches a predetermined value which corresponds to a predetermined increment gas volume;
   opening said gas outlet valve to allow gas to flow out of said chamber;
   closing said gas outlet valve;
   recording an increment volume of gas;
   calculating the total volume of gas since zero time and the volume of gas measured during a specified period of time; and
   outputting the total volume of gas since zero time and the volume of gas measured during a specified period of time to a display or recorder;
   wherein said gas flow is reversible.

9. A method as recited in claim 8, further comprising determining the volume of gas in said chamber as a function of the pressure and temperature in said chamber.

10. A method as recited in claim 9, further comprising maintaining the volume of gas in said chamber at a positive, predetermined level prior to opening the gas outlet valve.

11. A method as recited in claim 8, further comprising providing a user with information selected from the group consisting essentially of total volume of gas since zero time, volume of gas for a specified time period, and history of gas volume measurement over time.

12. A method as recited in claim 8, wherein said chamber is configured for operation at a controlled, constant temperature or at an ambient temperature.

13. A method as recited in claim 8, further comprising outputting gas volume at selected temperatures and pressure.

* * * * *